United States Patent [19]

Hoelzer

[11] Patent Number: 4,553,762
[45] Date of Patent: Nov. 19, 1985

[54] SHAFT SEAL RING

[75] Inventor: Helmut Hoelzer, Weinheim, Fed. Rep. of Germany

[73] Assignee: Firma Carl Freudenberg, Weinheim, Fed. Rep. of Germany

[21] Appl. No.: 510,344

[22] Filed: Jul. 1, 1983

[30] Foreign Application Priority Data

Oct. 11, 1982 [DE] Fed. Rep. of Germany ....... 3237638

[51] Int. Cl.⁴ .............................................. F16J 15/32
[52] U.S. Cl. ..................................... 277/152; 277/177
[58] Field of Search ...................... 277/35, 206 R, 173, 277/177, 47, 48, 152, 81 R

[56] References Cited

U.S. PATENT DOCUMENTS 2,267,930 12/1941 Leonard ................................. 277/35
4,294,700 10/1981 Casper ............................ 277/81 R
4,355,815 10/1982 Dück ............................... 277/206 R
4,474,379 10/1984 Hölzer ................................ 277/177
4,484,752 11/1984 Bentley .............................. 277/177
4,494,759 1/1985 Kieffer .............................. 277/177

Primary Examiner—Robert I. Smith
Attorney, Agent, or Firm—Felfe & Lynch

[57] ABSTRACT

A seal ring has a reinforcing ring with an inwardly-directed conical extension and a lip ring having elastic properties which embraces said extension in the manner of a U for a relatively-rotatable seal and bears on the shaft to be sealed as a static seal. The lip ring is a length of hose enlarged on one side to form an outwardly-directed flange. The hose portion of the lip ring is inserted into the extension of the reinforcing ring in the direction of its conical narrowing with the resulting elastic deformation at the flange tipping up the hose portion to form the U.

18 Claims, 4 Drawing Figures

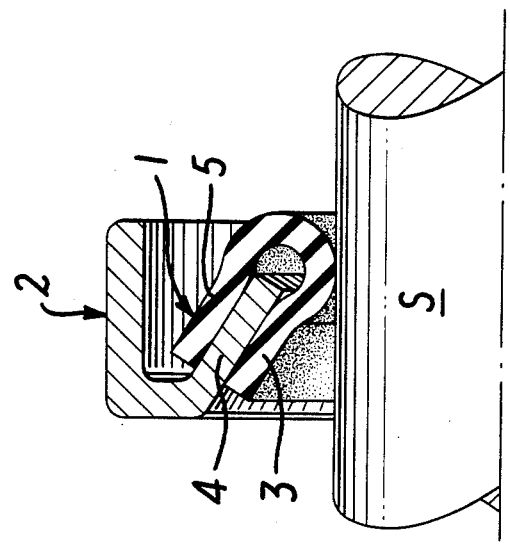
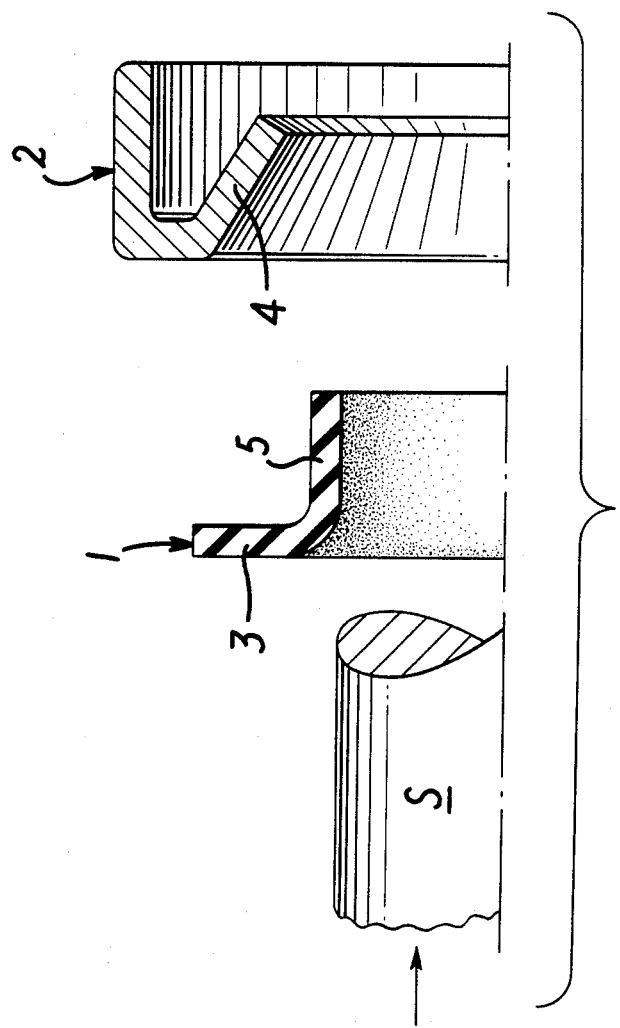

SHAFT SEAL RING

The invention relates to a shaft seal ring having a reinforcing ring with an inwardly directed conical extension and a lip ring having elastic properties which embraces said extension in the manner of a U and bears on the shaft to seal it.

A shaft seal ring is known from U.S. Pat. No. 2,267,930, but its lip ring is rigidly joined to the reinforcing ring which impairs the mobility of the lip ring. The lip ring also bears on the surface of the sealed shaft only with a narrow sealing lip on which all stresses which arise are therefore concentrated. Axial and/or radial shaft oscillations may therefore result in a premature breakdown.

The object of the invention is to improve a shaft seal ring in such a way that the drawbacks mentioned are eliminated.

In accordance with the invention, this object is accomplished by making the lip ring from a length of hose enlarged on one side to form an outwardly-directed flange. When the hose portion of the lip ring first is inserted into the extension of the reinforcing ring in the direction of its conical narrowing and the sealed medium with elastic deformation of the flange, it is held in that position by the hose section turning up against the extension to form a general U shape with the flange and a base therebetween about the innermost end of the extension, the outside surface of which forms a shaft bearing static seal surface.

The lip ring of the proposed design rotates with the shaft. The critical zone of dynamic sealing thus is shifted away from the surface of the sealed shaft and into the shaft seal ring itself, which enables the manufacturer of the shaft seal ring to guarantee a specific sealing result regardless of the quality characteristics of the shaft to be sealed.

In contrast to a design of the type outlined at the outset, the proposed design comprises two series-connected sealing surfaces (the arms of the general U shape) which together result in the desired sealing action. The outer of the two sealing surfaces is the one primarily exposed to dust and dirt while the inner sealing surface is the one primarily exposed to liquid from the sealed space. Thus they can be constructed accordingly. The sealing efficiency is enhanced both on the outside and on the inside by the centrifugal forces which are generated in operation.

A sequential arrangement of two series-connected sealing surfaces results in a reduction of the pressure acting on them. The contact pressure necessary to secure a given sealing action can thus be reduced, which has a beneficial effect on the service life.

Shifting the dynamic sealing surface into the shaft seal ring makes it possible to use in the manufacture of the reinforcing ring and of the lip ring materials specifically matched to each other with a view to securing optimum friction conditions. Suitable materials for the reinforcing ring are primarily metals and plastics. The former have the advantage of particularly good heat removal from the vicinity of the sealing zone. The latter, that of pronounced ease of manufacture when the profile deviates from simple rotational symmetry.

Suitable materials for the lip ring are, in addition to rubber-elastic materials, especially polyamide and PTFE (polytetraflouroethylene). Because of its "memory effect", the latter is distinguished by a markedly uniform pressure upon the extension over long periods of time.

For improved wear characteristics, the material used may contain fillers, and in particular fibers and/or colloidal graphite. This will also improve the dissipation of heat from the sealing zone.

The fabrication of the profile of the lip ring requires considerable care, depending on the material used. The initial profile may be characterized by a leg extending substantially in the axial direction and a leg extending substantially in the radial direction. These legs must possess sufficient inherent stability and elasticity to permit them to be turned up against the extension without tearing at the outer periphery and without accordion-like pleating, and while assuring liquid-tight contact with the extension. It is readily possible to ascertain whether all requirement are being met. The selection of suitable profiles poses no appreciable difficulties in this respect.

A design wherein the extension and/or the lip ring comprise surfaces extending parallel to one another is particularly easy to implement. Different profile configurations are possible, for example for modifying the contact pressure on both sides.

DESCRIPTION OF THE DRAWINGS

The invention will now be described in greater detail with reference to the accompanying drawings, wherein:

FIG. 1 shows an exploded or pre-assembly view of the upper half of sectioned components of a preferred embodiment;

FIG. 2 shows a view of the components of the embodiment shown in FIG. 1 in their assembled positions;

DESCRIPTION OF THE PREFERRED EMBODIMENTS

Figure 3:
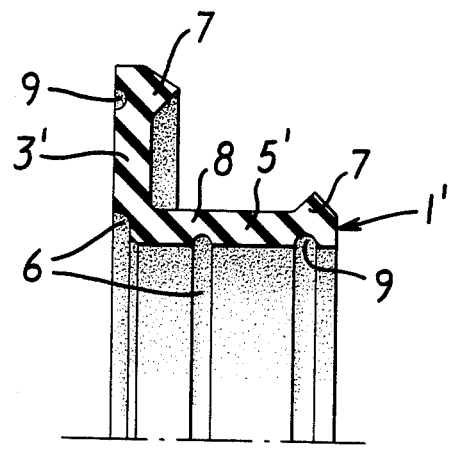
FIG. 3 shows, in section, the upper half of another embodiment of a lip ring (made of a relatively tough material of low elasticity)

The lip ring 1 in FIGS. 1 and 2 consists of a length of hose of a rubber-elastic material having a Shore A hardness of 68. It has a wall thickness of 1.5 mm and an inside diameter of 45 mm. At its left end it is enlarged to form a generally radial outwardly-directed flange 3 having an outside diameter of 55 mm and an axial thickness of 1.5 mm. The transition between the surfaces extending in the axial direction and in the radial direction is rounded, as is preferred in all cases.

The associated reinforcing ring 2 is formed of deep-drawn steel sheet of a thickness of 1.8 mm. It has a conical extension 4 the projection of which makes a solid angle of from 25° to 60° and preferable 54° with the axis of revolution of the rings and of shaft rotation. The inside diameter is 50 mm.

For manufacture, the lip ring 1 in FIG. 1 is shifted toward the right by an axial pressure (as from rightward movement of shaft S) acting upon the inside diameter of the flange 3 to cause the flange to bear on the internal conical surface of the extension 4. The axial hose like portion 5 then mounts the extension by this axial pressure. To help this, the axially-projecting, hose-like portion 5 may be conically flared outwardly (radially enlarging) in the direction away from flange 3 at a solid angle of convergence not exceeding about 150°, and preferably about 120°. When the flange then reaches the end of extension 4, the hose-like portion 5 will, due to its inherent elasticity, automatically tip leftward onto the external conical surface of the extension. The embedment of the reinforcing ring so obtained is stable. Maintaining it does not require application of an external force; that is shaft S may be removed if the seal ring thus formed is to be used on another shaft.

The flange 3 preferably forms a hollow, truncated cone oriented with the smaller diameter of the truncated cone at the hose-like section. That is, the generally radial section 3 preferably inclines leftward as shown in FIG. 1 from the axis of revolution of the lip ring and shaft S. The projection of the cone shape preferable forms a apex solid angle of from about 120° to less than 180°.

Figure 4:
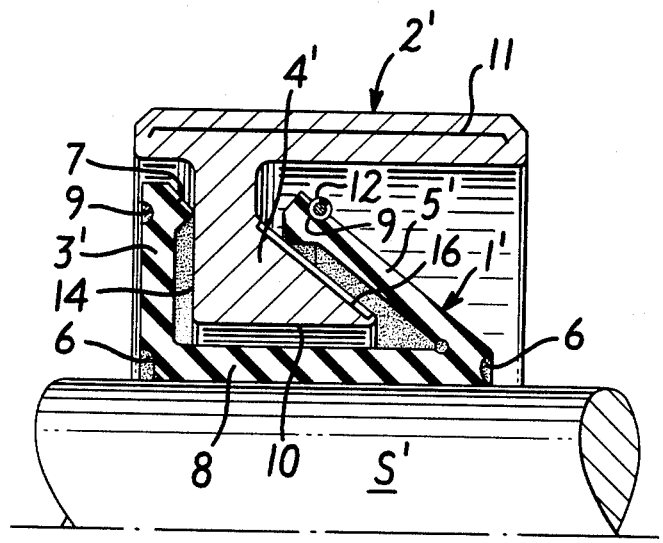
FIG. 4 shows the embodiment of FIG. 3, as installed.

FIGS. 3 and 4 relate to an embodiment wherein the lip ring 1' is made of PTFE. This material has a less pronounced resilience than rubber-elastic materials, but because of its "memory effect", parts made from it always tend to re-assume their original shape after cold deformation. In the proposed embodiment, such a return to the original shape is precluded in that a zone of maximum deformation has been passed at a tipping point. The "memory effect" thus can manifest itself only by equalizing the contact pressure exerted on the extension.

The lip ring 1' has profile areas which are two, weakening, inside peripheral grooves 6. These act in the manner of articulations and indicate the flange 3', the hose-like portion 5' (the latter preferably radially enlarging, as before, before assembly) and the position of a knee after installation. The area 8 extending axially between the two grooves is made relatively stiff to assure good contact with the shaft to be sealed.

The lip ring also has two peripheral sealing lips 7 which are bounded by two surfaces forming a sharp edge which, after installation, bears on the respective sides of the extension 4 (directed toward the outside air and toward the sealed medium). The sealing lips 7 may enclose the sealed shaft with rotational symmetry or with uniform undulations.

On the side facing away from the sealing lips 7, the lip ring 1' has peripheral grooves 9. If need be, these can accommodate garter springs 12 (only one to increase the contact pressure on the extension 4' being shown).

The conical extension has, on the side facing away from the conical extension surface 4' thereof and the sealed medium, a radial boundary surface 14 on which the flange 3' bears with relatively low initial tension. By means of the helical groove 16, a hydrodynamical back flow is achieved for leakage fluid which penetrated under the sealing lip into the chamber being sealed.

Between the conical extension surface 4' and the radial boundary surface 14 is a frontal area 10 generally parallel to the axis of revolution of the reinforcing ring 2'. The projection of the frontal area along the axis of revolution is approximately equal to the projection of the area 8 therealong. This embodiment is suited especially for use with high mechanical stresses, for example as a wheel-bearing seal for a motor vehicle.

Apart from the fact that is is easy to manufacture, the proposed seal ring offers the advantage of reliable operation under difficult conditions. Even in the simplest embodiments, the sealing action is promoted by the pressure of the medium to be sealed and by the rotary motion of the shaft. The surface quality of the shaft need not be particularly high. This makes for lower production costs and eliminates ambiguities with respect to warranty claims. The dimensions and the handling during installation may correspond to those of conventional radial shaft seal rings, and use for replacement purposes therefore is readily possible and poses no problems.

It will be understood that the specification and examples are illustrative but not limitative of the present invention and that other embodiments within the spirit and scope of the invention will suggest themselves to those skilled in the art.

What is claimed is:

1. A shaft seal ring made by the process comprising:
   providing a reinforcing ring having an inwardly-directed at least partly-conical extension;
   providing an elastically deformable lip ring having a hose-like, axial portion with an outwardly-directed flange on one side thereof; and
   inserting the hose-like, axial portion of the lip ring first into the extension of the reinforcing ring in the direction in which the extension conically narrows with an axial pressure acting on the inside diameter of the flange of the lip ring until the flange is sufficiently elastically deformed that the elastic deformability of the lip ring turns the hose-like portion up against the side of the extension opposite the flange,
   the lip ring then having a general U-shape engaging opposite sides of the extension with the arms of the generally U-shaped lip ring only sufficiently to form relatively-rotatable sealing surfaces with the extension, the base of the generally U-shaped lip ring extending about the innermost end of the extension to form a static shaft-bearing seal surface on the outside thereof.

2. The shaft seal ring of claim 1, wherein the extension is a sheet member and wherein the arms of the generally U-shaped lip ring are generally parallel to each other for engaging the opposite sides thereof.

3. The shaft seal ring of claim 1, wherein the conical part of the extension makes an angle of from about 25° to about 60° to the axis of revolution of the reinforcing ring.

4. The shaft seal ring of claim 1, wherein the hose-like section radially enlarges toward the side thereof away from the flange.

5. The shaft seal ring of claim 4, wherein the radial enlargement of the hose-like section is generally conical.

6. The shaft seal ring of claim 4, wherein the radial enlargement is at a solid angle of less than about 150°.

7. The shaft seal ring of claim 5, wherein the radial enlargement is at a solid angle of less than about 150°.

8. The shaft seal ring of claim 4, wherein the radial enlargement is at a solid angle of less than about 120°.

9. The shaft seal ring of claim 5, wherein the radial enlargement is at a solid angle of less than about 120°.

10. The shaft seal ring of claim 1, wherein the extension comprises a conical extension surface on one side, a radial boundary surface on the other side, and a frontal area therebetween generally parallel to the axis of revolution of the reinforcing ring.

11. The shaft seal ring of claim 1, wherein the extension comprises a conical extension surface on one side, a radial boundary surface on the other side, and a frontal area therebetween generally parallel to the axis of revolution of the reinforcing ring.

12. The shaft seal ring of claim 11, wherein the hose-like section has a first area from the flange side having a projection along the axis of revolution of the reinforcing ring approximately equal to the projection of the frontal area therealong when the hose-like section is inserted into the reinforcing ring, and a second area farther from the flange for forming one of the arms of the U-shape thereof which, before the insertion, generally conically enlarges away from the flange.

13. The shaft seal ring of claim 1, wherein the outwardly-directed flange forms a hollow, truncated cone oriented with the smaller diameter of the truncated cone at the hose-like section.

14. The shaft seal ring of claim 2, wherein the outwardly-directed flange forms a hollow, truncated cone oriented with the smaller diameter of the truncated cone at the hose-like section.

15. The shaft seal ring of claim 3, wherein the outwardly-directed flange forms a hollow, truncated cone oriented with the smaller diameter of the truncated cone at the hose-like section.

16. The shaft seal ring of claim 13, wherein the projection of the truncated cone forms a solid apex angle of from about 120° to less than 180°.

17. The shaft seal ring of claim 14, wherein the projection of the truncated cone forms a solid apex angle of from about 120° to less than 180°.

18. The shaft seal ring of claim 1, wherein at least one of the surfaces of the lip ring and/or of the reinforcing ring touching each other slidingly are connected with at least one hydrodynamically sealing helical groove (16) and/or rib.

* * * * *